(12) United States Patent
Moskovich

(10) Patent No.: US 6,411,444 B1
(45) Date of Patent: Jun. 25, 2002

(54) LENSES FOR ELECTRONIC IMAGING SYSTEMS HAVING LONG WAVELENGTH FILTERING PROPERTIES

(75) Inventor: Jacob Moskovich, Cincinnati, OH (US)

(73) Assignee: Corning Precision Lens, Incorporated, Cincinnati, OH (US)

(*) Notice: Subject to any disclaimer, the term of this patent is extended or adjusted under 35 U.S.C. 154(b) by 0 days.

(21) Appl. No.: 09/343,133

(22) Filed: Jun. 29, 1999

Related U.S. Application Data

(60) Provisional application No. 60/091,162, filed on Jun. 30, 1998.

(51) Int. Cl.[7] .................................. G02B 3/00
(52) U.S. Cl. ..................................... 359/722
(58) Field of Search .................. 359/722, 580–581, 359/589, 362–363; 438/60, 69–70, 75; 348/227, 272, 294, 340

(56) References Cited

U.S. PATENT DOCUMENTS

| | | | |
|---|---|---|---|
| 4,505,569 A | * 3/1985 | Seto et al. | 399/218 |
| 5,055,922 A | 10/1991 | Wessling | |
| 5,291,008 A | * 3/1994 | Havens et al. | 235/462.41 |
| 5,466,926 A | * 11/1995 | Sasano et al. | 250/216 |
| 5,666,175 A | * 9/1997 | Spitzer et al. | 349/95 |
| 5,837,994 A | * 11/1998 | Stam et al. | 250/208.1 |

FOREIGN PATENT DOCUMENTS

WO    WO 98/23988    6/1998

OTHER PUBLICATIONS

Rose et al., "Physical Limits to the Performance of Imaging Systems," *Physics Today,* Sep. 1989, pp. 24–32.

Séquin et al., "Charge Transfer Devices," *Advances in Electronics and Electron Physics,* suppl. 8, L. Marton editor, Academic Press, New York, 1975, pp. v–viii.

\* cited by examiner

*Primary Examiner*—Jordan M. Schwartz
(74) *Attorney, Agent, or Firm*—Maurice M Klee; Angela N Nwaneri

(57) ABSTRACT

Lenses for use with electronic imaging systems, e.g., systems employing CCDs, are provided. The lenses employ at least two lens elements, at least one of which is a dyed plastic lens element whose average percentage transmission for wavelengths between 400 nm and 550 nm is greater than its average percentage transmission for wavelengths between 550 nm and 700 nm. Through the use of such a dyed plastic lens element, the need for a separate spectral response flattening filter is eliminated thus reducing the cost, complexity, size, and weight of the electronic imaging system.

3 Claims, 4 Drawing Sheets

LENSES FOR ELECTRONIC IMAGING SYSTEMS HAVING LONG WAVELENGTH FILTERING PROPERTIES

CROSS REFERENCE TO RELATED PROVISIONAL APPLICATION

This application claims the benefit under 35 USC §119(e) of U.S. Provisional Application No. 60/091,162 filed Jun. 30, 1998 the content of which in its entirety is hereby incorporated by reference.

FIELD OF THE INVENTION

This invention relates to lenses for use with electronic imaging systems, e.g., systems employing charged coupled devices (CCDs) or similar light sensitive electronic components ("electronic sensors"). Such systems are well known in the art and descriptions thereof can be found in various references, including Rose et al., "Physical Limits to the Performance of Imaging Systems," *Physics Today*, September 1989, pages 24–32 and the references cited therein; and Sequin et al., "Charge Transfer Devices," *Advances in Electronics and Electron Physics*, suppl. 8, L. Marton editor, Academic Press, New York, 1975.

BACKGROUND OF THE INVENTION

Historically, electronic imaging systems have been most widely used in relatively expensive imaging devices such as video cameras. Today, electronic imaging systems are being used in even greater numbers in digital cameras, i.e., still cameras, which typically sell at substantially lower prices than video cameras.

As with any mass marketed item, cost is of extreme importance and is becoming even more so as competition in this expanding field increases. One of the basic characteristics of electronic sensors, specifically, CCDs, is their non-uniform spectral response in the visible region. FIG. 2 shows a typical CCD spectral response curve. As illustrated therein, sensitivity in the visible region, i.e., from about 400 nm (blue light) to about 700 nm (red light), is substantially greater at longer wavelengths (near-IR wavelengths) than at shorter wavelengths.

Significantly, this increase in sensitivity at longer wavelengths is opposite to the spectral response of the human eye, which has a maximum at about 550 nanometers (yellow-green light) and then rapidly drops off at longer (and shorter) wavelengths. Accordingly, modification of the CCD spectral response must be performed to produce an image which is acceptable for human viewing, e.g., to produce an image which has acceptable flesh tones.

Some of the disparity between the spectral responses of electronic sensors on the one hand and the human eye on the other can be dealt with electronically, e.g., by digital processing, after the image has been detected. However, it has been found that such electronic compensation is, in general, inadequate and thus CCD cameras routinely include planar filters for flattening the spectral response curve at longer wavelengths. Such filters are located between the taking lens and the electronic sensor and are usually manufactured as part of the lens but sometimes are made part of the sensor. In some cases, expensive dichroic filters are used to minimize light loss, while in others, simple absorption filters are used.

FIG. 3 shows a typical transmission curve for a filter suitable for flattening the spectral response curve of a CCD, and FIG. 4 shows the spectral response of a CCD with (lower curve) and without (upper curve) such a filter.

The use of planar filters increases the cost, complexity, size, and weight of electronic imaging systems. In addition, such filters often place added constraints on the taking lenses used with such systems since the lens must have a back focal length long enough to accommodate the filter, as well as any other components which the camera manufacturer wishes to locate between the taking lens and the electronic sensor. The present invention addresses these deficiencies in the art by providing lens systems for electronic imaging systems which have inherent long wavelength filtering properties thus eliminating the need for a separate planar filter between the lens and the sensor.

SUMMARY OF THE INVENTION

In view of above considerations, it is an object of the present invention to provide improved lens systems for electronic imaging systems. In particular, it is an object of the invention to provide lens systems which eliminate the need for a separate spectral response flattening filter between the lens and the electronic sensor. It is an additional object of the invention to provide lens systems which perform a filtering function and still achieve the level of optical performance required by electronic imaging devices.

To achieve these and other objects, the invention provides lens systems for use in electronic imaging systems of the type which employ broad band electronic sensors, said lens system comprising a dyed plastic lens element whose average percentage transmission for wavelengths between 400 nm and 550 nm is greater than its average percentage transmission for wavelengths between 550 nm and 700 nm.

As used herein, a "dyed plastic lens element" is a plastic lens element throughout which an absorptive color filter material has been dispersed. Preferably, the dispersion is achieved by dissolving the dye in the base plastic material so as to minimize particulate inclusions which can scatter light.

The dyed plastic element should have a relatively uniform thickness over the portion of the element through which light passes (the "operative clear aperture") so that the attenuation of longer wavelength light is relatively uniform over the light sensitive surface of the electronic imaging device. It should be noted that because electronic sensors are small, the lenses used with such sensors are also often small. Accordingly, to facilitate handling, such lens elements often have a physical size which is greater than the element's operative clear aperture. Such oversized elements can have thicknesses which vary substantially from the center to the edge of the element, while still being relatively uniform over the operative clear aperture as is desired for relatively uniform attenuation. In general terms, the ratio of the maximum to the minimum thickness of the dyed lens over the operative clear aperture should be less than 1.5 and preferably less than 1.3.

The dyed plastic element is preferably produced by injection molding of a pre-dyed plastic resin, e.g., an acrylic, styrene, or similar resin. Such pre-dyed plastic resins are available from various manufacturers, including Autohaas of Philadelphia, Penn., and Mitsubishi Rayon of Tokyo, Japan. These manufacturers can generally provide dyed resins having absorption properties suitable for flattening the spectral response of any particular electronic imaging system.

The level of spectral flattening required will depend upon the particular application, including the quality of the image desired for the final product. In some cases, only a minor amount of long wavelength absorption will be needed, while in others high levels will be required. The manufacturers of moldable plastic resins can generally meet the requirements of any particular application by varying the types and quantities of dye included in the resin.

In comparison to other filtering methods, e.g., the application of a coating to a lens element, the use of a dyed resin to form a plastic lens element is considered preferred in terms of cost, ease of production, and optical quality of the finished product. Quality is of particular importance since CCDs have a high level of resolution, and thus lenses used with such devices must be of high optical quality.

Lens coating is normally a complex process which, if not done with precision, can lead to degradation in optical performance. Moreover, spectral filtering by means of a coating typically requires additional processing steps beyond those employed in the standard production process. Using a dyed resin as a starting material, on the other hand, typically involves only minor changes to the production process, e.g., minor adjustments in molding temperatures or times, which can be readily determined and implemented by persons skilled in the art. Lens quality generally remains unchanged whether a dyed or an un-dyed resin is used as the starting material for a molded lens element.

The number of lens elements employed in the lens system will depend on the performance requirements of the imaging system. In general, fewer elements are preferred to minimize cost. Commonly-assigned PCT Patent Publication No. WO 98/23988 entitled "Lenses For Electronic Imaging Systems", the contents of which are incorporated herein by reference, discloses various two element lens designs which can be used in the practice of the present invention. Other designs can, of course, be used if desired. Generally only one lens element will be dyed, although multiple dyed elements can be used and, in some cases, may facilitate the achievement of a desired spectral transmission function.

These drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention.

DESCRIPTION OF THE PREFERRED EMBODIMENTS

Figure 1:
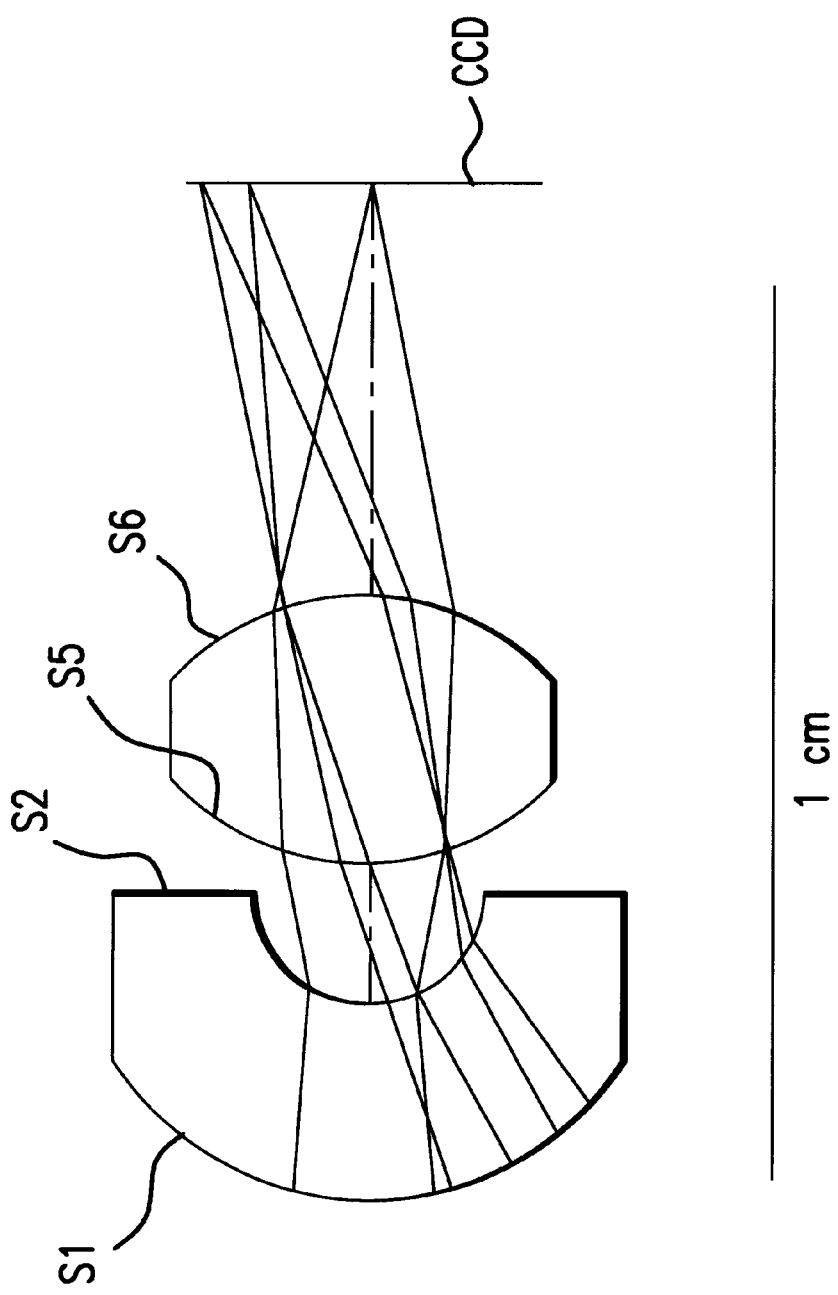
FIG. 1 is a schematic side view of a lens system constructed in accordance with the invention.
Figure 2:
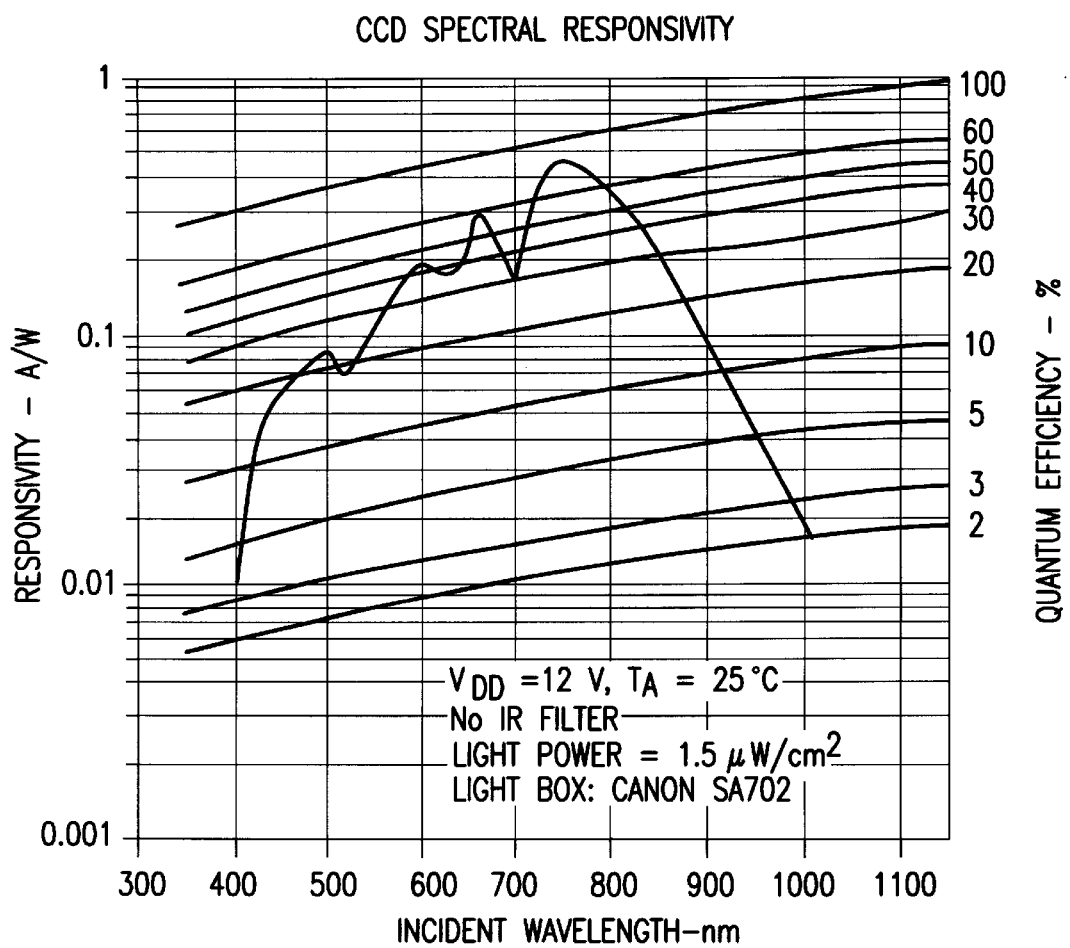
FIG. 2 is a representative spectral response curve for a CCD.

FIG. 1 illustrates a lens system constructed in accordance with the invention. The prescription for this lens system is set forth in Table 1 where all dimensions are given in millimeters. The designation "c" associated with surfaces 2 and 5 in this table represents a conic surface. In particular, these surfaces are described by the following equation:

$$z = \frac{cy^2}{1 + [1 - (1+k)c^2 y^2]^{1/2}}$$

where z is the surface sag at a distance y from the optical axis of the system, c is the curvature of the lens at the optical axis, and k is the conic constant. Surface 3 in Table 1 is an optional vignetting surface.

The abbreviations used in the table are as follows:

| | |
|---|---|
| EFL | effective focal length |
| FVD | front vertex distance |
| f/ | f-number |
| ENP | entrance pupil as seen from the long conjugate |
| BRL | barrel length |
| OBJ HT | object height |
| MAG | magnification |
| STOP | location and size of aperture stop |
| IMD | image distance |
| OBD | object distance |
| OVL | overall length. |

As is conventional, FIG. 1 is drawn with the long conjugate on the left and the short conjugate on the right. Accordingly, in the typical application of the invention, the object to be viewed will be on the left and an electronic imaging system, e.g., a system employing a CCD, will be on the right.

Figure 3:
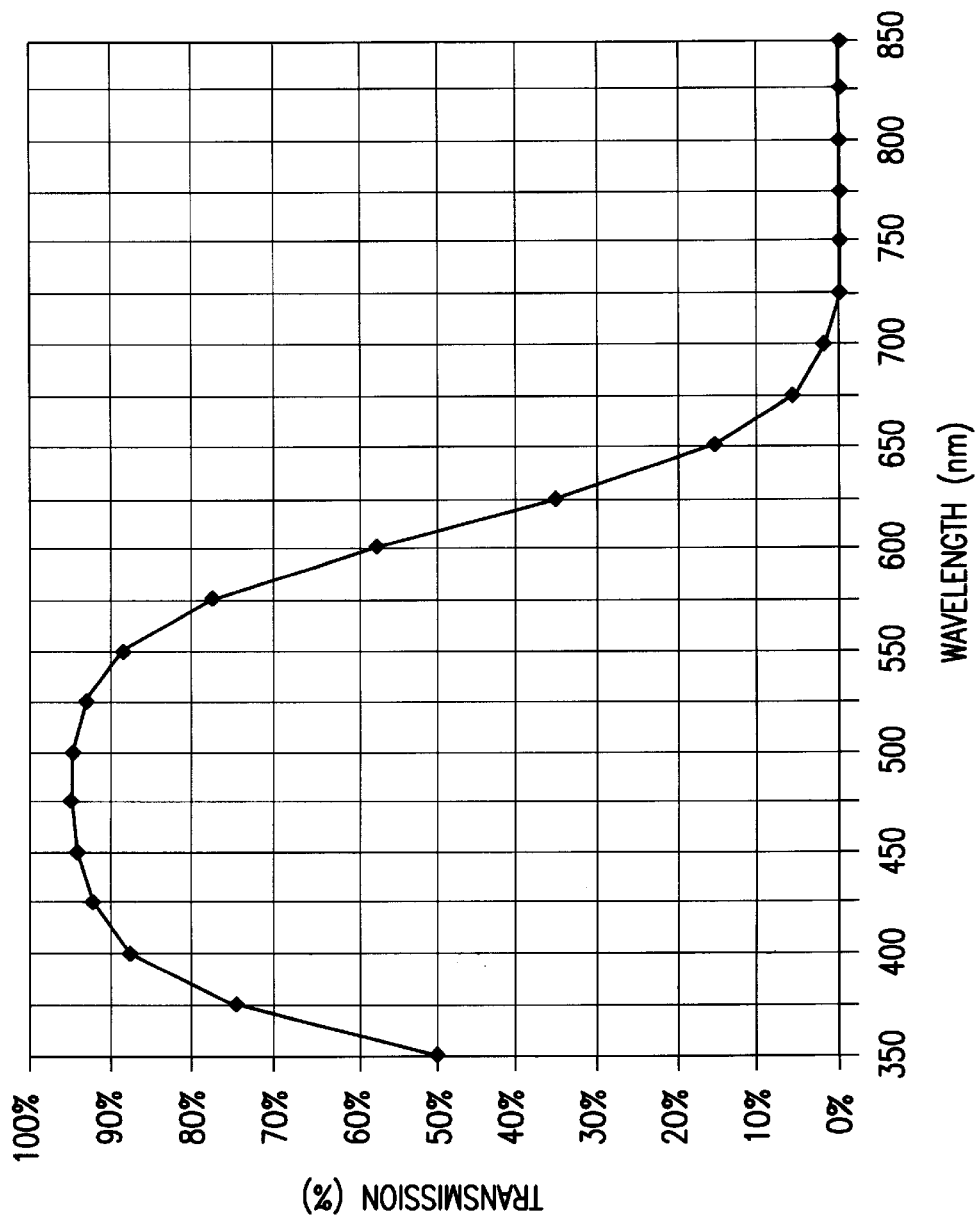
FIG. 3 is a representative transmission curve for a CCD spectral flattening filter. As can be seen in this figure, the average percentage transmission for wavelengths between 400 nm and 550 nm is greater than the average percentage transmission for wavelengths between 550 nm and 700 nm.
Figure 4:
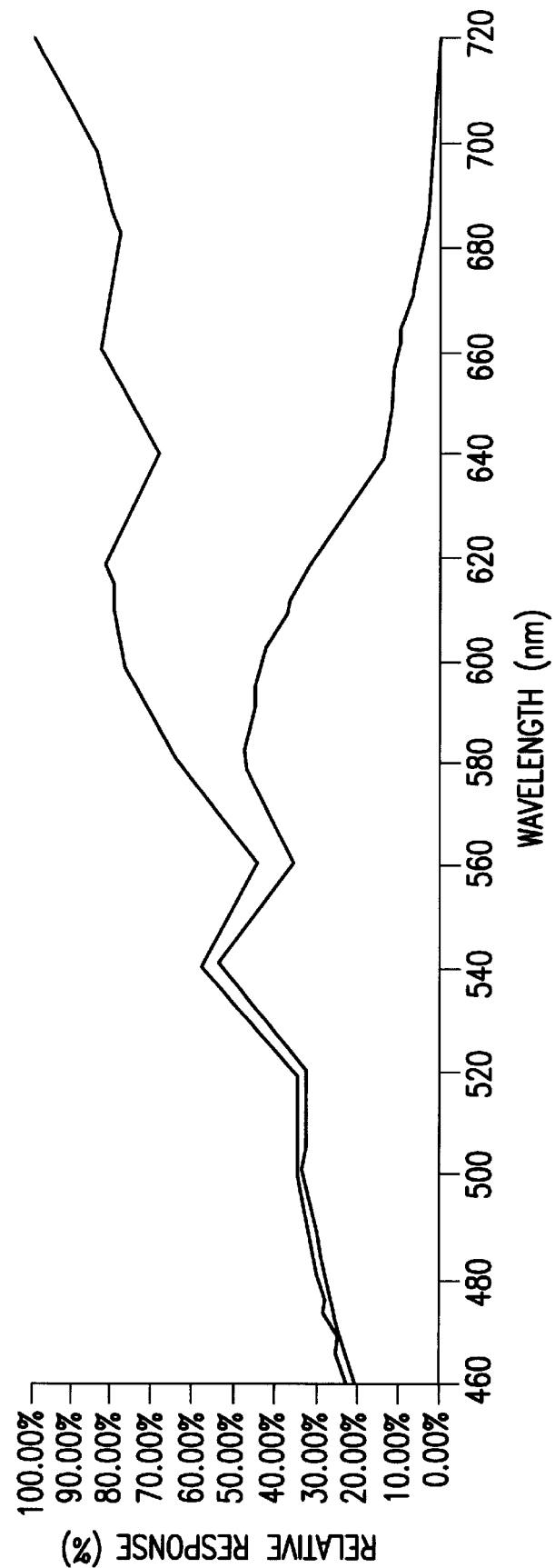
FIG. 4 shows representative spectral response curves for a CCD with (lower curve) and without (upper curve) a spectral flattening filter.

The styrene resin used to form the first lens element (S1–S2) of FIG. 1 is an industry acceptable material. The acrylic resin used for the second lens element (S5–S6) is a dyed resin which is formulated by Autohaas (Philadelphia, Penn.) to have a transmission spectrum of the type shown in FIG. 3. The operative clear aperture diameter for the second lens element is 2.0 mm and the ratio of the maximum to minimum lens thickness over this aperture is approximately 1.2 which is sufficiently small to permit relatively uniform filtering of the light reaching the CCD. It should be noted that thickness variation over the operative clear aperture of the first lens element is also small enough for this lens element to serve as the dyed element, either alone or in combination with a dyed second element.

Although the invention has been described in connection with a presently preferred embodiment thereof, it is to be understood that a variety of modifications which do not depart from the scope and spirit of the invention will be evident to persons of ordinary skill in the art from the foregoing disclosure.

TABLE 1

| Surf. No. | Type | Radius | Thickness | Glass | Clear Aperture Diameter |
|---|---|---|---|---|---|
| 1 | | 3.2864 | 2.29000 | STYRENE | 5.60 |
| 2 | c | 1.0741 | 1.51000 | | 2.30 |
| 3 | | ∞ | 0.00000 | | 1.90 |
| 4 | | 2.8125 | 3.10000 | ACRYLIC | 3.90 |
| 5 | c | −1.9129 | 0.00000 | | 3.90 |
| 6 | | Aperture stop | 4.44413 | | 1.82 |

Symbol Description
c - Conic section

| Conics | |
|---|---|
| Surface Number | Constant |
| 2 | −3.1855E−01 |
| 5 | −1.4577E+00 |

TABLE 1-continued

SYSTEM FIRST ORDER PROPERTIES

| OBJ. HT: | −225.00 | f/ | 2.50 | MAG: | −0.0080 |
|---|---|---|---|---|---|
| STOP: | 0.00 | after surface 6. | | DIA: | 1.811 |
| EFL: | 3.80984 | FVD: | 11.3441 | ENP: | 5.45981 |
| IMD: | 4.44413 | BRL: | 6.90000 | EXP: | 0.0000 |
| OBD: | −474.040 | OVL: | 485.384 | | |

Focal Shift = −0.02543

First Order Properties of Elements

| Element Number | Surface Numbers | Power | f' |
|---|---|---|---|
| 1 | 1 2 | −0.22890 | −4.3688 |
| 2 | 4 5 | 0.3396S | 2.9442 |

What is claimed is:

1. An electronic imaging system comprising:
   an electronic sensor which has a non-uniform spectral response in the spectral region from 400 nm to 700 nm, and
   a lens system which comprises a dyed plastic lens element whose average percentage transmission for wavelengths between 400 nm and 550 nm is greater than its average percentage transmission for wavelengths between 550 nm and 700 nm,
   wherein the dyed plastic lens element has an operative clear aperture and the ratio of the maximum to the minimum thickness of said element over said aperture is less than 1.5.

2. The electronic imaging system of claim 1 wherein the ratio of the maximum to the minimum thickness of the dyed plastic lens element over said aperture is less than 1.3.

3. The electronic imaging system of claim 1 wherein the electronic sensor is a charged coupled device.

* * * * *